United States Patent
Watanabe

[11] Patent Number: 6,134,205
[45] Date of Patent: Oct. 17, 2000

[54] OPTICAL DISK DEVICE AND AN INFORMATION READING METHOD APPLIED THEREIN

[75] Inventor: Kazutaka Watanabe, Tokyo, Japan

[73] Assignee: NEC Corporation, Tokyo, Japan

[21] Appl. No.: 09/181,646

[22] Filed: Oct. 29, 1998

[30] Foreign Application Priority Data

Oct. 30, 1997 [JP] Japan .................................. 9-299080

[51] Int. Cl.[7] .................................................. G11B 33/02
[52] U.S. Cl. .................................................. 369/77.1
[58] Field of Search .................................. 369/77.1–77.2, 369/75.1–75.2

[56] References Cited

U.S. PATENT DOCUMENTS 5,978,340  11/1999  Tanaka et al. ........................ 369/77.2

FOREIGN PATENT DOCUMENTS

| | | |
|---|---|---|
| 59-157871 | 9/1984 | Japan . |
| 62-124670 | 6/1987 | Japan . |
| 2-122488 | 5/1990 | Japan . |
| 4-38676 | 2/1992 | Japan . |
| 7-32736 | 6/1995 | Japan . |
| 8-249863 | 9/1996 | Japan . |

Primary Examiner—Allen T. Cao
Attorney, Agent, or Firm—Foley & Lardner

[57] ABSTRACT

To provide an optical disk device wherein information reading/writing of a desired content of a recording medium can be started immediately when its disk tray is re-loaded without removal of the recording medium, the optical disk device comprises a disk tray (2) whereon an optical disk to be loaded is set, a disk detection switch (3) for discriminating whether an optical disk is set or not on the disk tray, a main controller (4) having a function for controlling the optical disk device to read medium information only when a removal of an optical disk loaded on the optical disk device is checked to have been performed just before loading of the optical disk, referring to a logical sequence of a detection signal output from the disk detection switch (3).

9 Claims, 3 Drawing Sheets

OPTICAL DISK DEVICE AND AN INFORMATION READING METHOD APPLIED THEREIN

BACKGROUND OF THE INVENTION

The present invention relates to an optical disk device, and particularly to that wherein medium information reading is appropriately performed by detecting removal of a recording medium loaded therein, and an information reading method applied in the optical disk device.

In many optical disk devices, there is provided a means for detecting whether a recording medium is set or not.

In a Japanese utility model application laid open as a Provisional Publication No. 32736/'95, there is disclosed a recording medium detecting means, which is used for easily discriminating whether a CD (Compact Disk) is accommodated or not in each of CD trays provided in a magazine. For the purpose, a detecting pin, which is protruding towards a CD storage space, is provided in each of the CD trays of the magazine. The detecting pin is pushed when a CD is set in the storage space, and turns a mark provided at a visible end of each of the CD trays. A photo-detector provided on a CD-tray elevator, which takes charge of loading a CD tray on a CD player, detects turning of the mark. Information of the mark thus detected is stored in a memory for each of the CD trays to be referred to afterward.

In a Japanese patent application laid open as a Provisional Publication No. 38676/'92, another detecting means is disclosed, wherein an optical reflection detecting element is used in combination with a transparent hole provided in a base of a disk tray. When the disk tray with a disk is set at a loaded position, a detection light radiated from the optical reflection detecting element fixed to a chassis is projected through the transparent hole onto a recording surface of the disk to be reflected thereby. By catching the reflected detection light returning through the transparent hole, the optical reflection detecting element confirms existence of a readable disk. When the disk tray arrives at a certain position in an ejecting process of the disk tray, a reflection piece provided at a back end of the disk tray comes upward of the optical reflection detecting element, and reflects the detection light again, which is catched by the optical reflection detecting element so that the accomplishment of the ejecting process is confirmed.

Further, in many optical disk devices, when setting of a recording medium is detected making use of a recording medium detecting means such as above described, medium information concerning the recording medium itself, such as directory information, header addresses of contents or information concerning defect sectors, is read out and stored in a memory, prior to receiving read/write commands of the contents, so that the information reading/writing of the contents can be performed immediately, when a read/write command is received, referring to the medium information thus prepared in the memory.

However, this pre-reading of the medium information has been conventionally performed only based on whether a readable recording medium is set or not. Hence, every time a disk tray is loaded (after an ejection) on an optical disk device, the pre-reading of the medium information is performed again on the assumption that the recording medium is possible to have been changed, even when the disk tray is re-loaded without changing the recording medium.

This takes unnecessary time to be wasted until information reading/writing of a desired contents begins.

SUMMARY OF THE INVENTION

Therefore, a primary object of the present invention is to provide an optical disk device wherein information reading/writing of a desired content of a recording medium can be started immediately when its disk tray is re-loaded without removal of the recording medium.

In order to achieve the object, an optical disk device according to the invention comprises:

a disk tray whereon an optical disk to be loaded on the optical disk device is set;

a disk detection switch for discriminating whether an optical disk is set or not on the disk tray;

an optical head for reading medium information recorded in an optical disk loaded on the optical disk device;

a memory for storing the medium information; and a main controller of the optical disk device having a function for controlling the optical disk device to read the medium information only when a removal of an optical disk loaded on the optical disk device is checked to have been performed just before loading of the optical disk, referring to a logical sequence of a detection signal output of the disk detection switch.

The disk detection switch may comprise a lifting contact which is pushed downward with loading weight of an optical disk which is set on the disk tray, and a fixed contact which is connected to the lifting contact electrically for enabling the detection signal when the lifting contact is pushed downward with the loading weight of the optical disk, or it may comprise a photo-switch for enabling the detection signal when an optical disk is set on the disk tray.

The main controller includes a latch circuit, whereof a set terminal is supplied with the detection signal output from the disk detection switch and a reset terminal is supplied with an ejection signal which is enabled when the disk tray is ejected, and the main controller controls reading of the medium information according to output logic of the latch circuit.

The output logic of the latch circuit indicates to perform reading of the medium information when the detection signal has been once disabled during the ejection signal is enabled last.

Therefore, when the disk tray is set at the loading position after changing of the optical disk, the pre-reading of medium information of the optical disk is performed in the same way as in conventional optical disk devices. However, the pre-reading of the medium information is omitted in case the disk tray is re-loaded without performing removal of the optical disk, enabling to economize unnecessary time wasted for the pre-reading of the medium information, according to the invention.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 3:
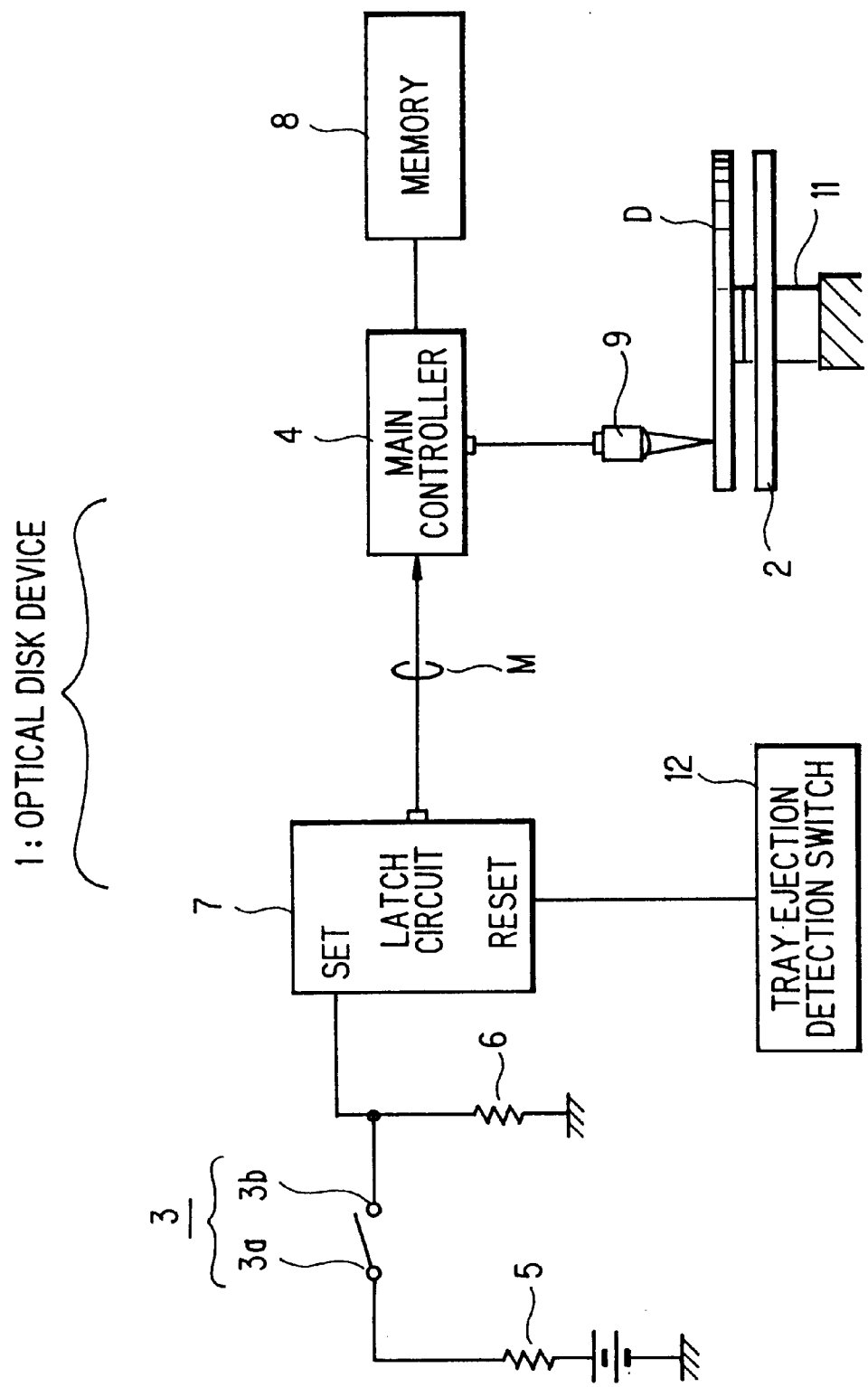
FIG. 3 is a block diagram illustrating a functional configuration of the optical disk device 1.

FIG. 3 is a block diagram illustrating an optical disk device according to an embodiment of the invention.

Referring to FIG. 3, the optical disk device 1 of the embodiment comprises a disk tray 2 whereon an optical disk D is to be loaded, a disk detection switch 3 for detecting existence of the optical disk D on the disk tray 2, an optical head 9 for reading medium information of the optical disk D, a memory 8 for storing the medium information read out by the optical head 9, and a main controller 3 including a latch circuit 7 for controlling components of the optical disk device 1, together with other ordinary components, including a tray-ejection detection switch 12, for reading/writing the optical disk D.

The main controller 4 has a selective reading function to control the optical disk device 1 to perform reading of the medium information only when a removal of the optical disk D is detected by way of the disk detection switch 3.

In the following paragraphs, the present invention will be described to be applied to the optical disk device 1. However, application of the present invention is not limited to the optical disk device 1. It can be applied widely to a memory storage device having a removable recording medium such as a DVD-RAM, or a floppy disk.

Figure 1:
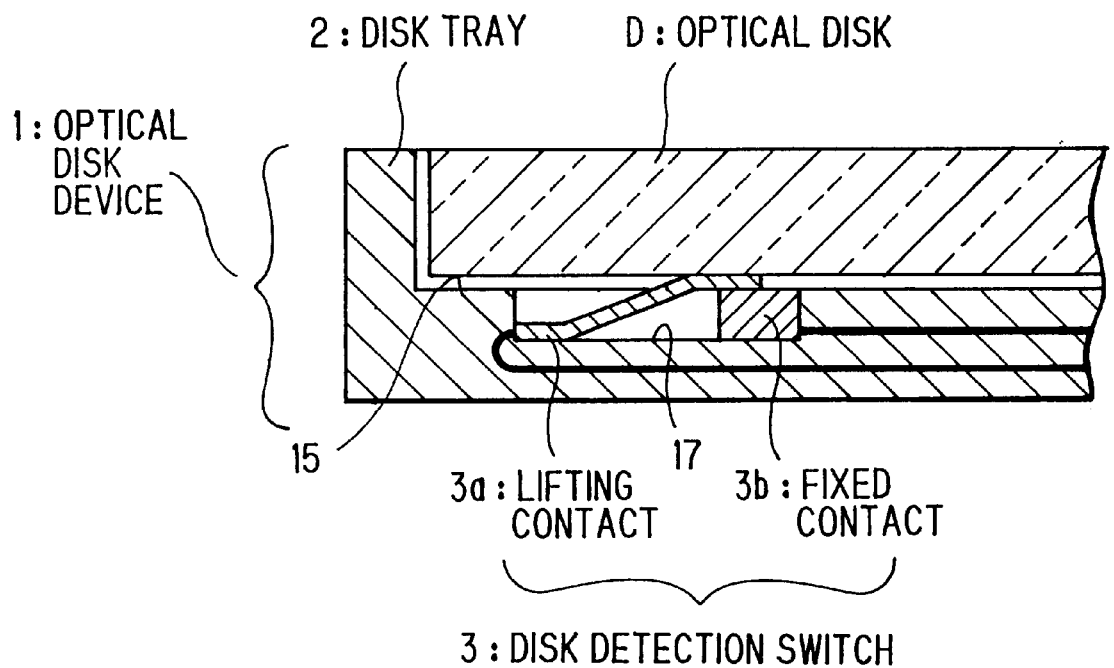
FIG. 1 is a partial sectional view illustrating an optical disk device 1 according to an embodiment of the invention wherein an optical disk D is loaded on its disk tray 2.

FIG. 1 is a partial sectional view illustrating the optical disk device 1 around the disk detection switch 3 with the optical disk D loaded on the disk tray 2. The disk tray 2 has a concave part 15 wherein the optical disk D is to be loaded. A user of the optical device 1 inserts the disk tray 2 into the optical disk device 1 after loading the optical disk D to be reproduced on the concave part 15.

When the disk tray 2 is set in the optical disk device 1, the optical disk D is positioned just upon a spindle motor 11 (FIG. 3), and the optical disk D is carried out and turned with a fixed speed by the spindle motor 11. Then, the optical head 9 of the optical disk device 1 reads information recorded in the optical disk D.

At a bottom of the concave part 15 of the disk tray 2, there is provided a pit 17 in the embodiment, wherein the disk detection switch 3 is installed. The disk detection switch 3 comprises a lifting contact 3a and a fixed contact 3b. The lifting contact 3a is designed to be pushed downward with loading weight of the optical disk D so as to be connected electrically with the fixed contact 3b positioned under the lifting contact 3a, as illustrated in FIG. 1.

Figure 2:
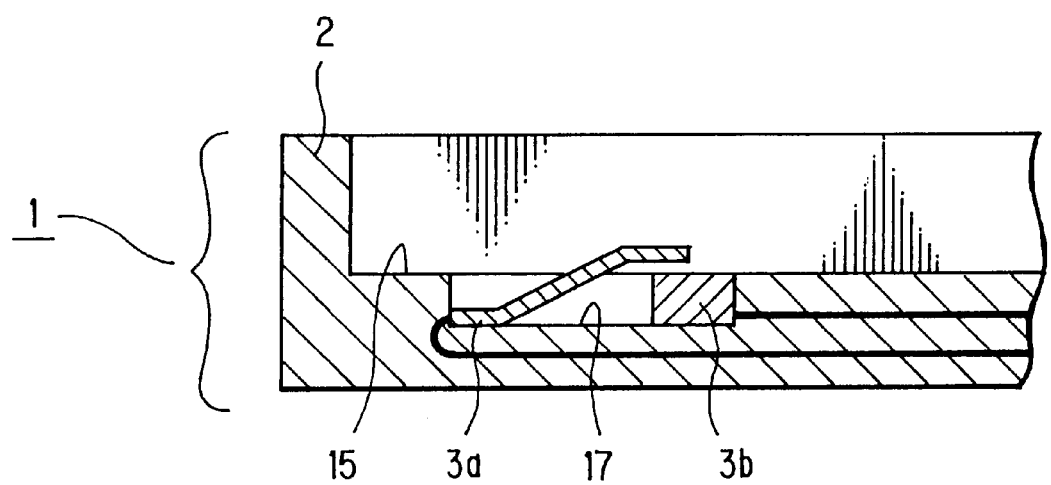
FIG. 2 is a partial sectional view illustrating the optical disk device 1 wherein no optical disk is loaded on the disk tray 2.

When the optical disk D is removed from the concave part 15 of the disk tray 2 after ejected, the lifting contact 3a lifts up and is cut electrically from the fixed contact 3b, as shown in a sectional view of FIG. 2 illustrating the optical disk device 1 wherein the optical disk D is removed from the disk tray 2 thereof.

Now, returning to FIG. 3, a control operation of the main controller 4 of the optical disk device 1 is described. The lifting contact 3a is connected to a voltage source through a first resistor 5, and the fixed contact 3b, which is connected to a ground terminal through a second resistor 6, is coupled to a set terminal of the latch circuit 7.

The resistance values of the first and the second resistor 5 and 6 are so determined that the latch circuit 7 retains positive logic during the lifting contact 3a is connected to the fixed contact 3b, and it is turned to negative logic when the lifting contact 3a is once cut from the fixed contact 3b.

To a reset terminal of the latch circuit 7, an ejection signal is supplied from the tray-ejection detection switch 12. Logic of the ejection signal becomes positive when the status of the disk tray 2 is changed from a loaded status to an ejected status.

Therefore, when the disk tray 2 is re-loaded after an ejection without removing the optical disk D, as illustrated in FIG. 1, the signal supplied to the set terminal is maintained at the positive logic from the ejection until the re-loading, and hence, logic of an output signal M of the latch circuit 7 is maintained to be positive.

On the other hand, when the optical disk D is once removed from the disk tray 2 during the disk tray 2 is at the ejected status, as illustrated in FIG. 2, the lifting contact 3a lifts off and is cut from the fixed contact 3b, and the signal supplied to the set terminal of latch circuit 7 becomes at logic negative, which is latched by the latch circuit 7 and the output signal M of the latch circuit 7 remains at the negative logic when the disk tray 2 is re-loaded after another optical disk is set thereon.

Figure 4:
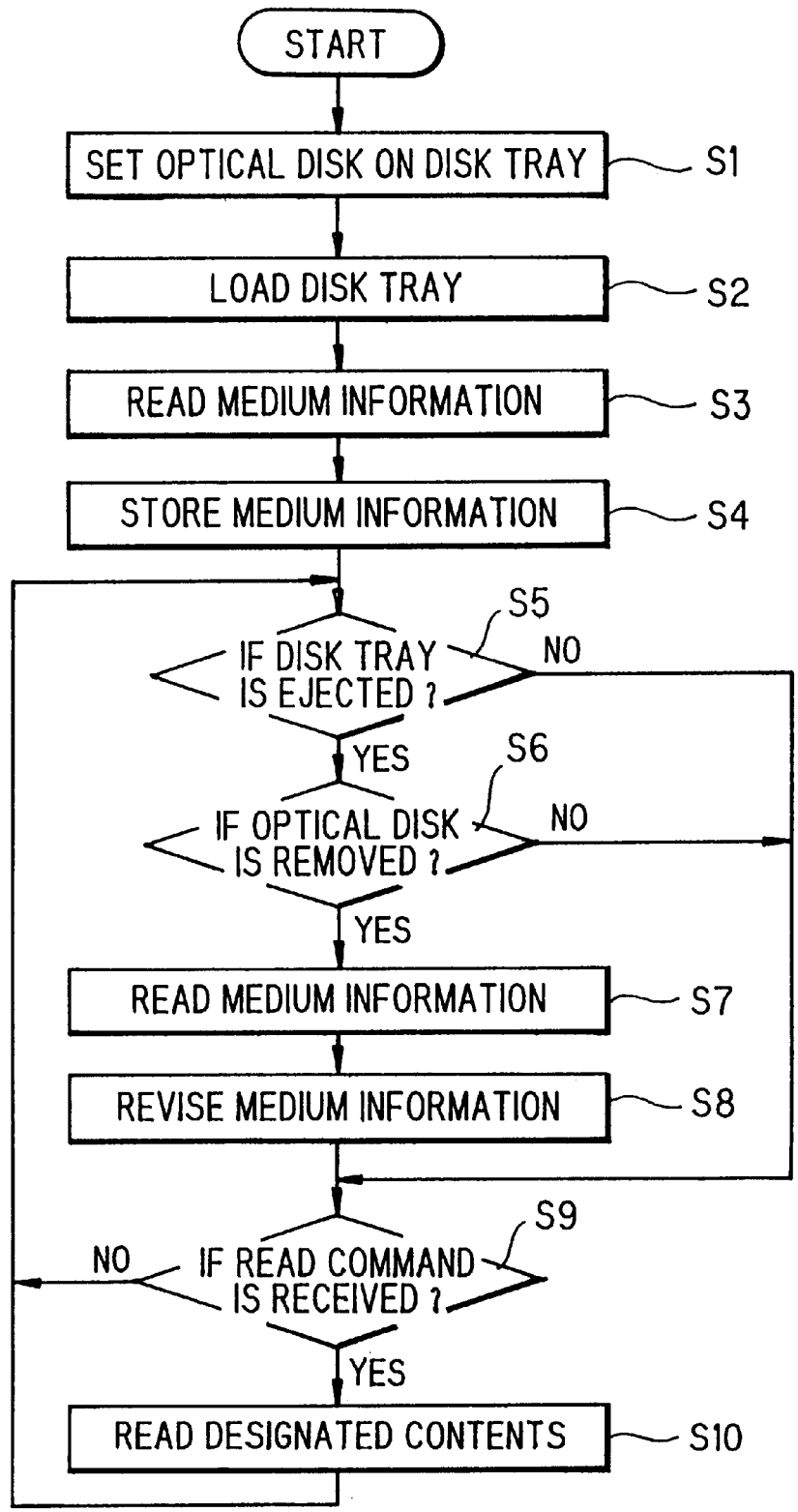
FIG. 4 is a flowchart illustrating an information reading procedure of the optical disk device 1.

Now, an information reading procedure of the optical disk device 1 is described referring to a flowchart of FIG. 4.

When an optical disk D is set on the disk tray 2 (at step S1) and the disk tray 2 is loaded in the optical device 1 (at step S2) under control of the main controller 4 according to user's manipulation, a laser light is projected from the optical head 9 for first performing servo control of focusing and tracking of the optical head 9.

After the servo control, the medium information, such as directory information, header addresses of contents or information concerning defect sectors, of the optical disk D is read out (at step S3) and stored in the memory 8 (at step S4), and then, receiving a read command (at step S9), contents of the optical disk D designated by the read command are read out (at step S10) from the optical disk D referring to the medium information stored in the memory 8, since the disk tray 2 is not ejected (step S5: NO) after the loading of the optical disk D. Then, the control returns to step S5.

When ejection and re-loading of the disk tray 2 is detected by the tray-ejection detection switch 12 (step S5: YES), the main controller 4 refers to the output signal M of the latch circuit 7 (at step S6). When the output signal M is at the negative logic, the optical disk D is possible to have been changed as beforehand described (step S5: YES). Therefore, the medium information in the memory 8 is initialized and pre-reading of the medium information of the loaded optical disk is performed again (at step S7), and the medium information newly read out is stored (at step S8) in the memory 8 to be referred to when a read command of the optical disk is received (at step S9).

When logic of the output signal M of the latch circuit 7 is found positive, the optical disk D can be determined not to have been changed (step S6: NO). In this case, the control goes directly to step S9, omitting the pre-reading of the medium information (steps S7 and S8).

Thus, the unnecessary time wasted for the pre-reading of the medium information is avoided according to the embodiment, in case the optical disk is not changed even when ejection and re-loading of the disk tray 2 is performed.

Heretofore, the present invention is described in connection with the embodiment having the disk detection switch 3 consisting of the lifting contact 3a and the fixed contact 3b as illustrated in FIGS. 1 and 2. However, the scope of the invention is not limited in the embodiment. For example, the disk detection switch 3 may be replaced with an optical sensor equipped on the disk tray 2 which can detect whether the optical disk D is set or not on the disk tray 2.

What is claimed is:

1. An optical disk device comprising:
   a disk tray whereon an optical disk to be loaded on the optical disk device is set;
   a disk detection switch which discriminates whether an optical disk is set or not on the disk tray;
   an optical head which reads medium information recorded in an optical disk loaded on the optical disk device;
   a memory which stores the medium information; and
   a main controller which controls the optical disk device to read the medium information only when the optical disk has been removed while the disk tray is ejected.

2. An optical disk device as recited in claim 1, the disk detection switch comprising a photo-switch which enables a detection signal when the optical disk is set on the disk tray.

3. An optical disk device comprising:
   a disk tray whereon an optical disk to be loaded on the optical disk device is set;
   a disk detection switch which discriminates whether an optical disk is set or not on the disk tray, the disk detection switch comprising:
      a lifting contact which is pushed downward with loading weight of the optical disk which is set on the disk tray; and
      a fixed contact which is connected to the lifting contact electrically and
      enabling a detection signal when the lifting contact is pushed downward with the loading weight of the optical disk;
   an optical head which reads medium information recording in an optical disk loaded on the optical disk device;
   a memory which stores the medium information; and
   a main controller which controls the optical disk device to read the medium information only when the optical disk has been removed while the disk tray is ejected.

4. An optical disk device comprising:
   a disk tray whereon an optical disk to be loaded on the optical disk device is set;
   a disk detection switch which discriminates whether an optical disk is set or not on the disk tray;
   an optical head which reads medium information recorded in an optical disk loaded on the optical disk device;
   a memory which stores the medium information; and
   a main controller which controls the optical disk device to read the medium information only when the optical disk has been removed while the disk tray is ejected; wherein:
      the main controller includes a latch circuit, comprising a set terminal being supplied with a detection signal output from the disk detection switch and a reset terminal being supplied with an ejection signal which is enabled when the disk tray is ejected; and
      the main controller controls reading of the medium information according to output logic of the latch circuit.

5. An optical disk device as recited in claim 4, wherein the output logic of the latch circuit which indicates to perform the reading of the medium information when the detection signal has been disabled while the ejection signal is enabled.

6. An optical disk device as recited in claim 4, wherein the disk detection switch comprises:
   a lifting contact which is pushed downward with loading weight of the optical disk which is set on the disk tray; and
   a fixed contact with is connected to the lifting contact electrically and enabling a detection signal when the lifting contact is pushed downward with the loading weight of the optical disk.

7. An information reading method of an optical disk device, comprising:
   enabling an ejection signal when a disk tray of the optical disk device is ejected;
   disabling a detection signal when an optical disk set on the disk tray is removed;
   enabling a medium information reading signal when the detection signal has been disabled while the ejection signal is enabled; and
   performing reading of medium information of an optical disk after the optical disk is loaded only when the medium information reading signal is enabled.

8. A method of operating a data reading device, comprising:
   placing a first disk on a disk tray of the data reading device;
   loading the disk tray into the data reading device;
   reading a medium information recorded in the first disk;
   storing the medium information;
   ejecting the disk tray;
   determining if the first disk is removed from the disk tray while the disk tray is ejected;
   reloading the disk tray into the data reading device;
   it if was determined that the first disk was removed from the disk tray while the disk tray was ejected, then reading a medium information of a disk located on the disk tray after the disk tray is reloaded; and
   reading designated contents of the disk located on the disk tray after the disk tray is reloaded.

9. The method of claim 8, wherein:
   the step of placing the first disk comprises placing a first optical disk into a first concave part of the disk tray; and
   the step of reading the medium information of a disk located on the disk tray after the disk tray is reloaded comprises reading the medium information of an optical disk located in the first concave part of the disk tray.

* * * * *